(12) United States Patent
Zinter

(10) Patent No.: US 11,598,459 B1
(45) Date of Patent: Mar. 7, 2023

(54) CLAMP PAWL DEVICE

(71) Applicant: Barney Zinter, Milton-Freewater, OR (US)

(72) Inventor: Barney Zinter, Milton-Freewater, OR (US)

( * ) Notice: Subject to any disclaimer, the term of this patent is extended or adjusted under 35 U.S.C. 154(b) by 0 days.

(21) Appl. No.: 17/511,392

(22) Filed: Oct. 26, 2021

(51) Int. Cl.
*F16L 33/08* (2006.01)

(52) U.S. Cl.
CPC .................................... *F16L 33/08* (2013.01)

(58) Field of Classification Search
CPC ...................................................... F16L 33/08
See application file for complete search history.

(56) References Cited

U.S. PATENT DOCUMENTS

| 4,546,524 | A | * | 10/1985 | Kreft | F16L 33/02 |
| | | | | | 24/274 WB |
| 7,055,225 | B1 | * | 6/2006 | Brant, Jr. | F16L 33/02 |
| | | | | | 285/420 |
| 2008/0289153 | A1 | * | 11/2008 | Bowater | F16L 33/08 |
| | | | | | 29/244 |
| 2010/0281655 | A1 | * | 11/2010 | De Campos | F16L 33/08 |
| | | | | | 24/19 |
| 2015/0068016 | A1 | * | 3/2015 | Harris | F16B 39/20 |
| | | | | | 24/280 |

\* cited by examiner

*Primary Examiner* — David M Upchurch
(74) *Attorney, Agent, or Firm* — Sierra IP Law, P.C.; Mark D. Miller

(57) ABSTRACT

The apparatus is a pawl clamping rachet device used with pipe or hose clamps when working in a tight space limiting access to advancing a slotted band needed for tightening the hose clamp. The apparatus having upstanding planar guide walls which guide a slotted band as the band is advanced through a gap with the band restrained in moving backwards by a pawl tooth having a spring function.

3 Claims, 7 Drawing Sheets

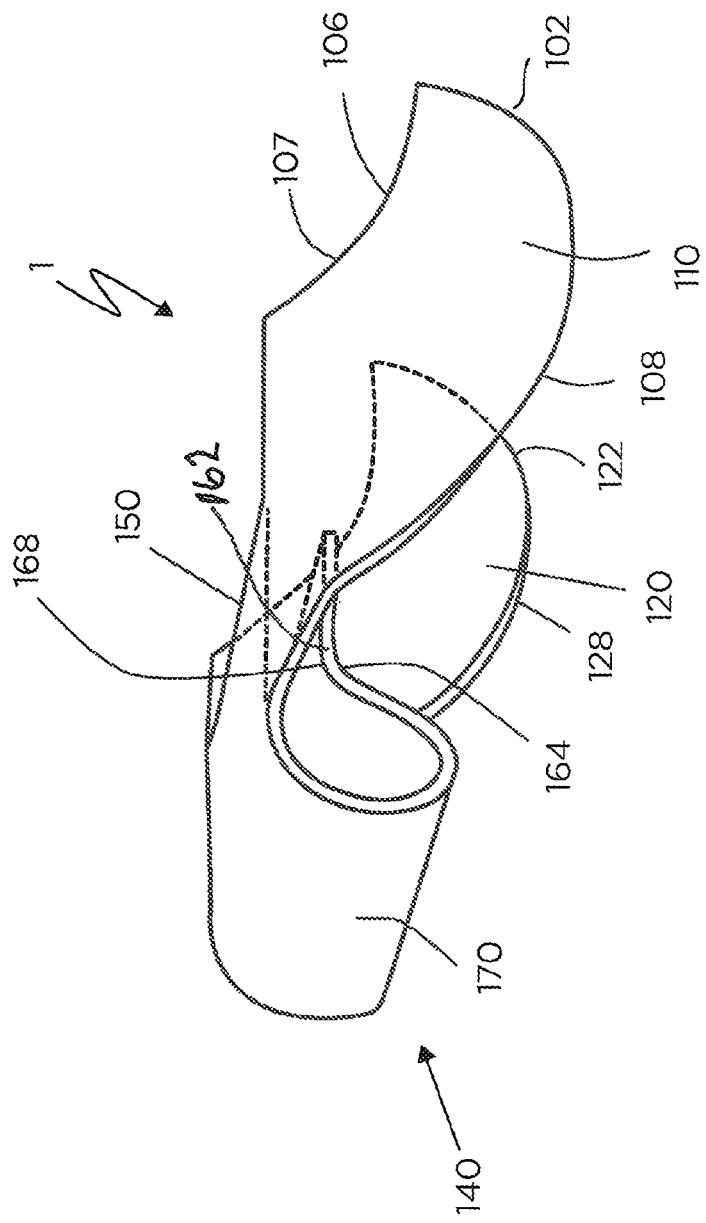

CLAMP PAWL DEVICE

FIELD AND BACKGROUND OF THE INVENTION

Pipe and hose clamps may involve the passage of a slotted band into a gap of a worm gear. There is difficulty in advancing a slotted band to encompass a hose or pipe or pipe flange when the hose or pipe or flange to be clamped is in a tight location. This Clamp Pawl Device provides a structure allowing hand forces to advanced and tighten a slotted band to a position where a screwdriver or wrench can continue tightening to the desired degree.

The patents and publications referred to herein including U.S. Pat. No. 4,546,524 to Kreft, 1985 and U.S. Pat. No. 7,055,255 to Brant, Jr., et al., 2006 are deemed to not be prior art.

SUMMARY OF THE INVENTION

The apparatus is a pawl clamping device having upstanding planar guide walls which guide a slotted band as the band is advanced through a gap with the band restrained in moving backwards by a pawl tooth having a spring function.

BRIEF DESCRIPTION OF THE FIGURES

The foregoing and other features and advantages of the present invention will become more readily appreciated as the same become better understood by reference to the following detailed description of the preferred embodiment of the invention when taken in conjunction with the accompanying drawings, wherein:

FIG. 7 illustrates a rear perspective view of the clamp pawl device (1).

DETAILED DESCRIPTION OF THE INVENTION

Figure 1:
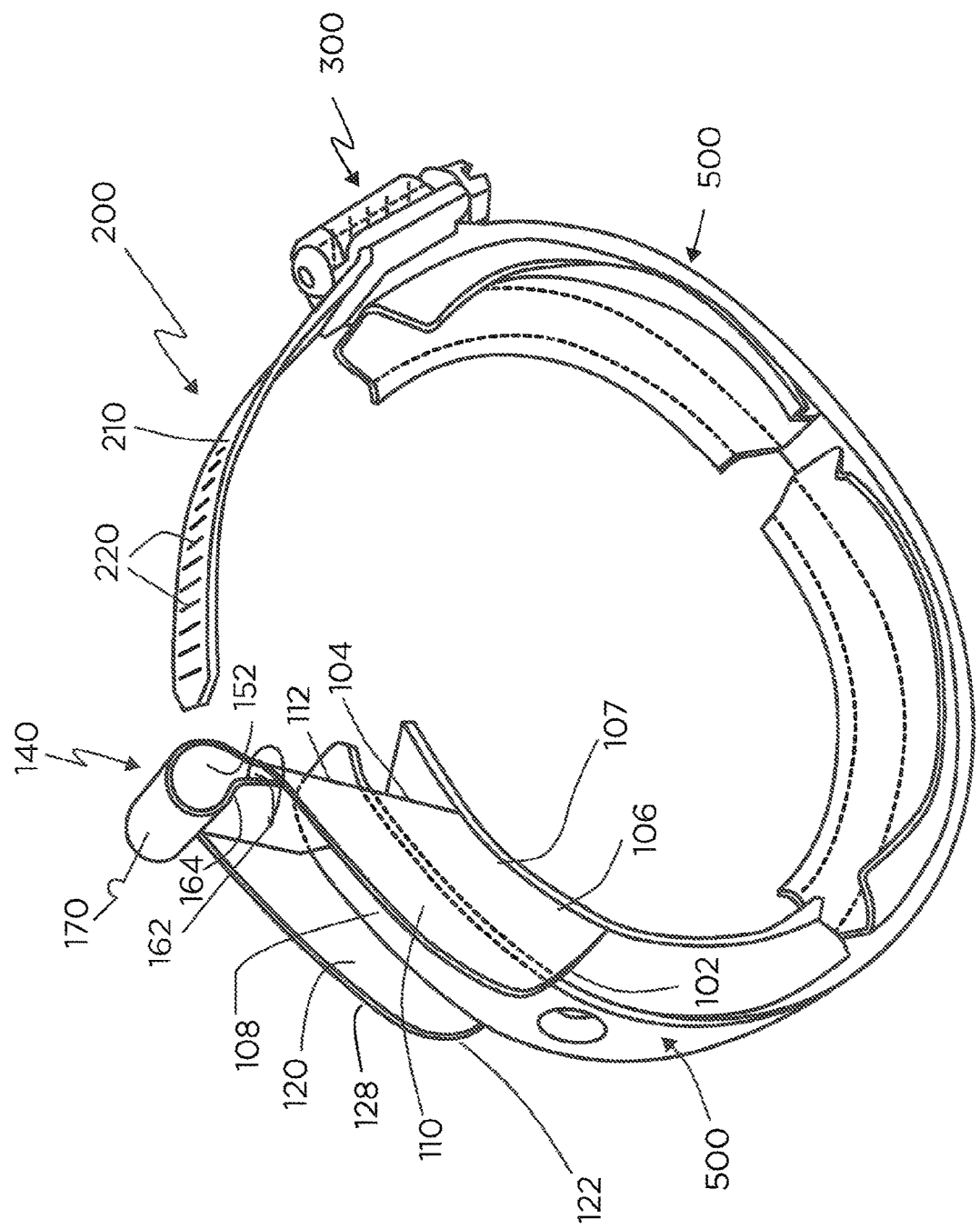
FIG. 1 illustrates a perspective right side front view of the clamp pawl device (1) also showing a slotted metal band (200) having slots (220), a pipe clamp (500) and a worm gear (300) which advances the metal band (200) thereby tightening the pipe clamp (500). It is recognized that the device (1) is the invention herein and that the pipe clamp (500) and metal band (200) merely exhibit the manner of functioning of the device (1) relative to a pipe clamp (500).
Figure 2:
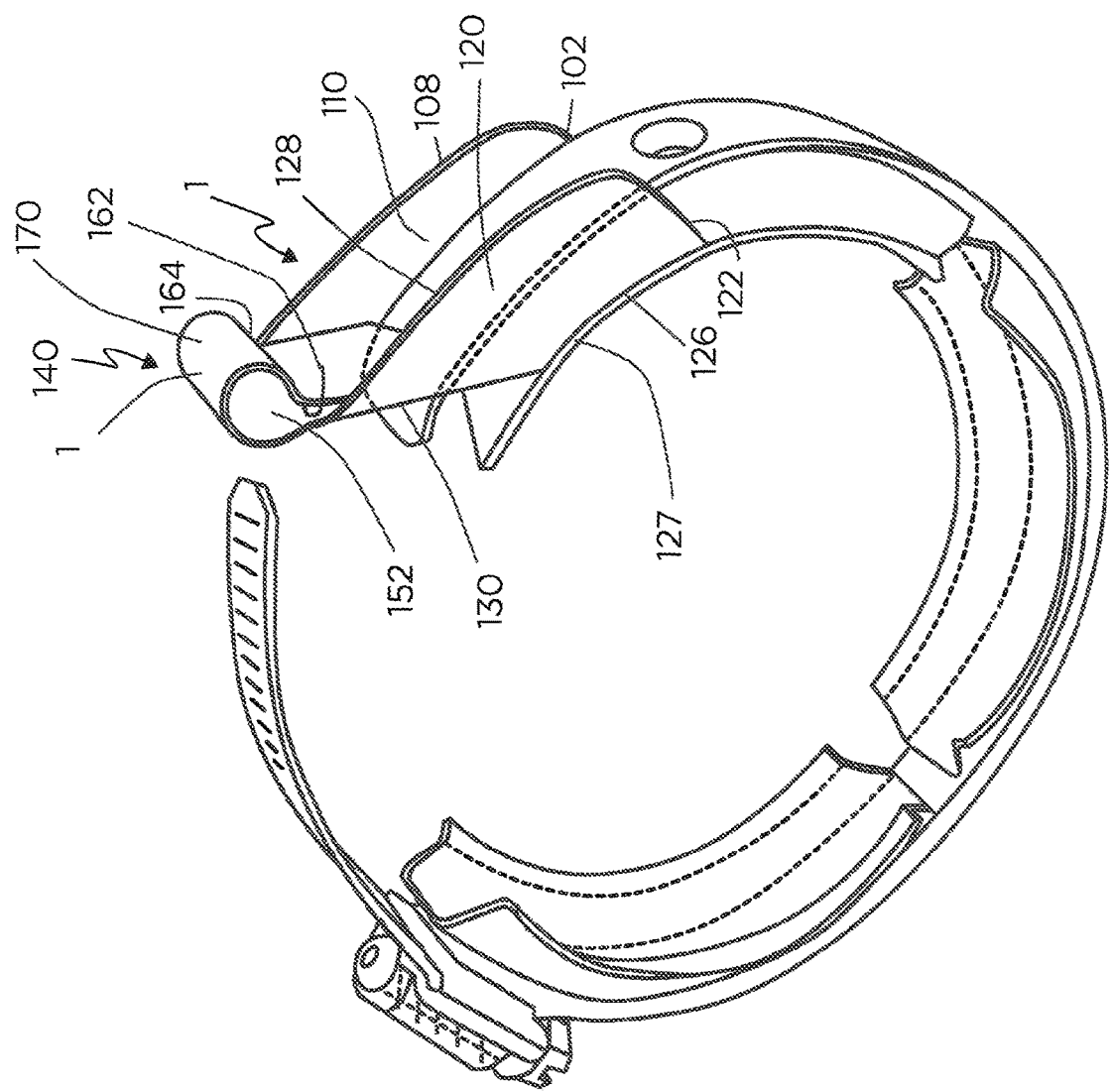
FIG. 2 illustrates a perspective left side front view of the device (1).
Figure 3:
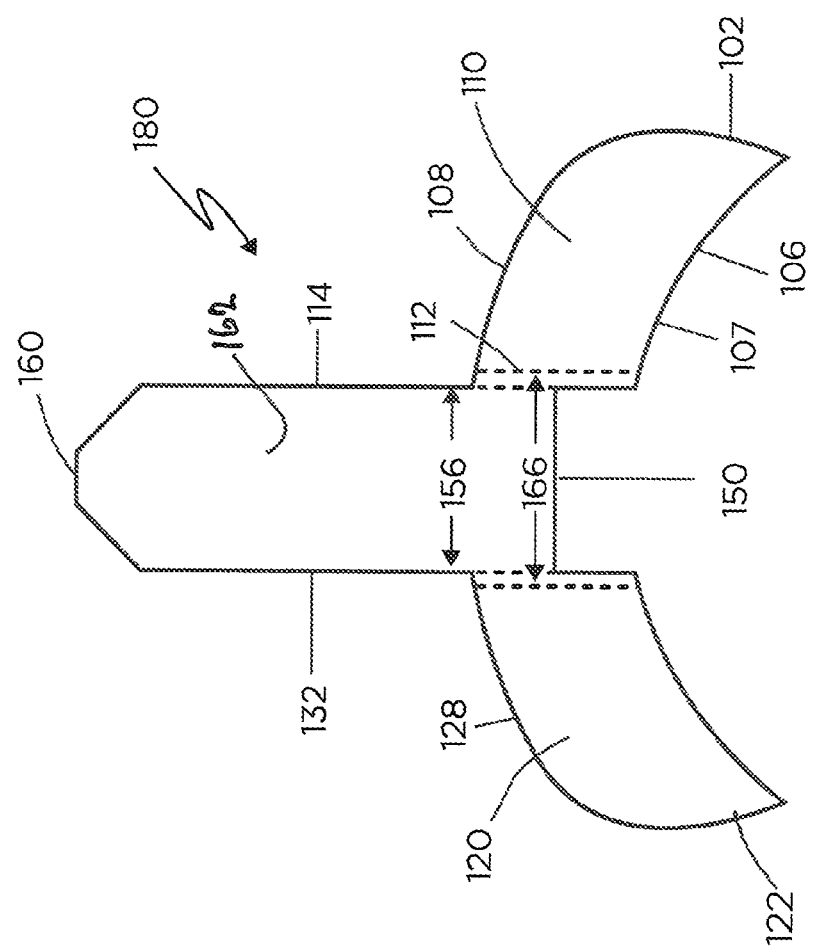
FIG. 3 illustrates a view of A clamp pawl device (1) formed from a metal pawl stamping (180) of a metal pawl stamping (180) from which a clamp pawl device (1) is formed.
Figure 4:
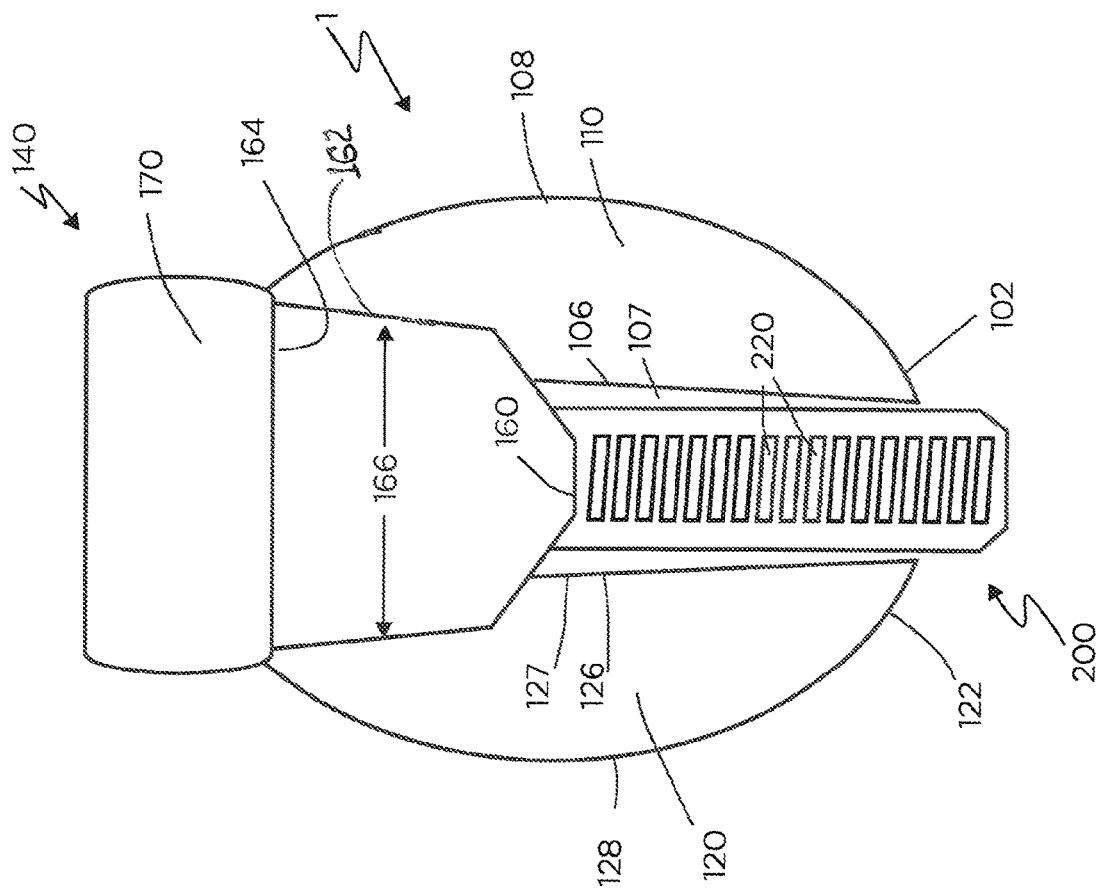
FIG. 4 is a front view of the clamp pawl device (1) also illustrating a slotted metal band (200).
Figure 5:
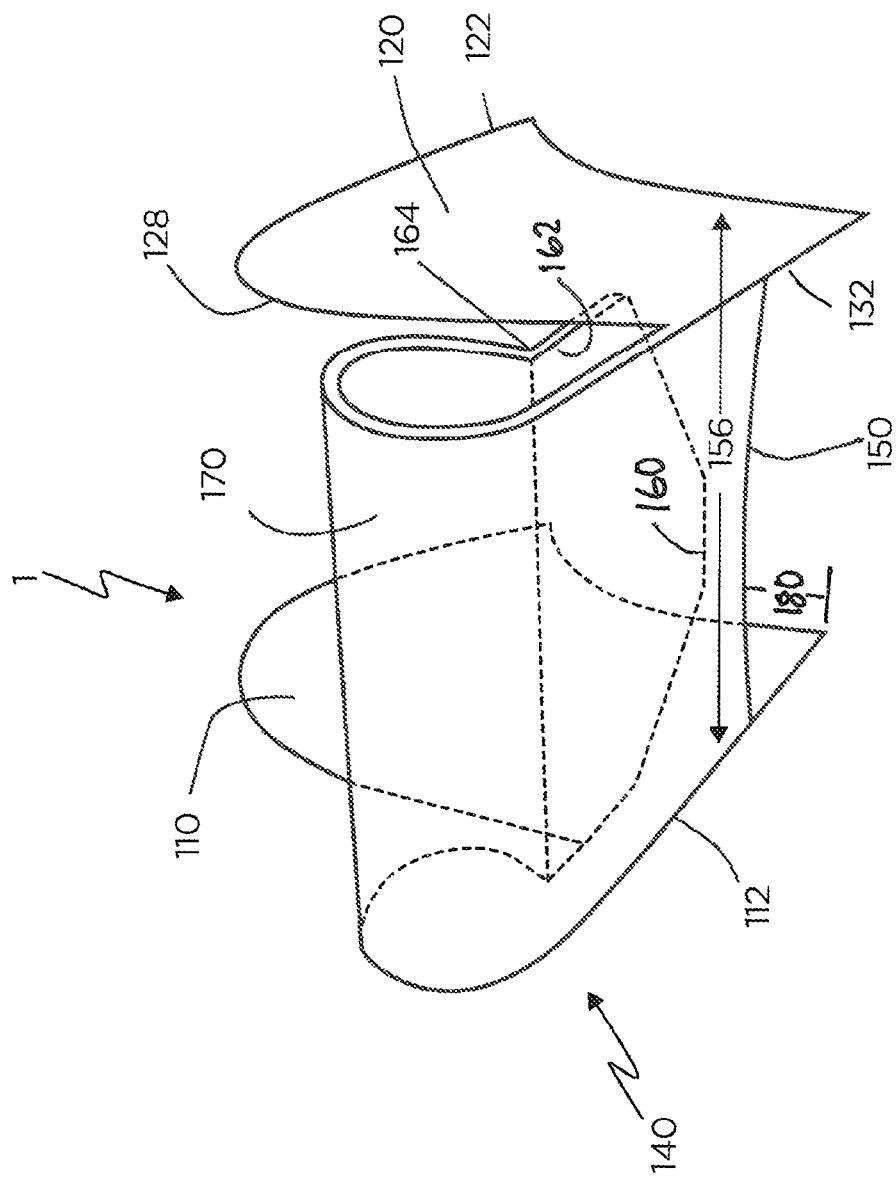
FIG. 5 is a top rear view of the clamp pawl device.
Figure 6:
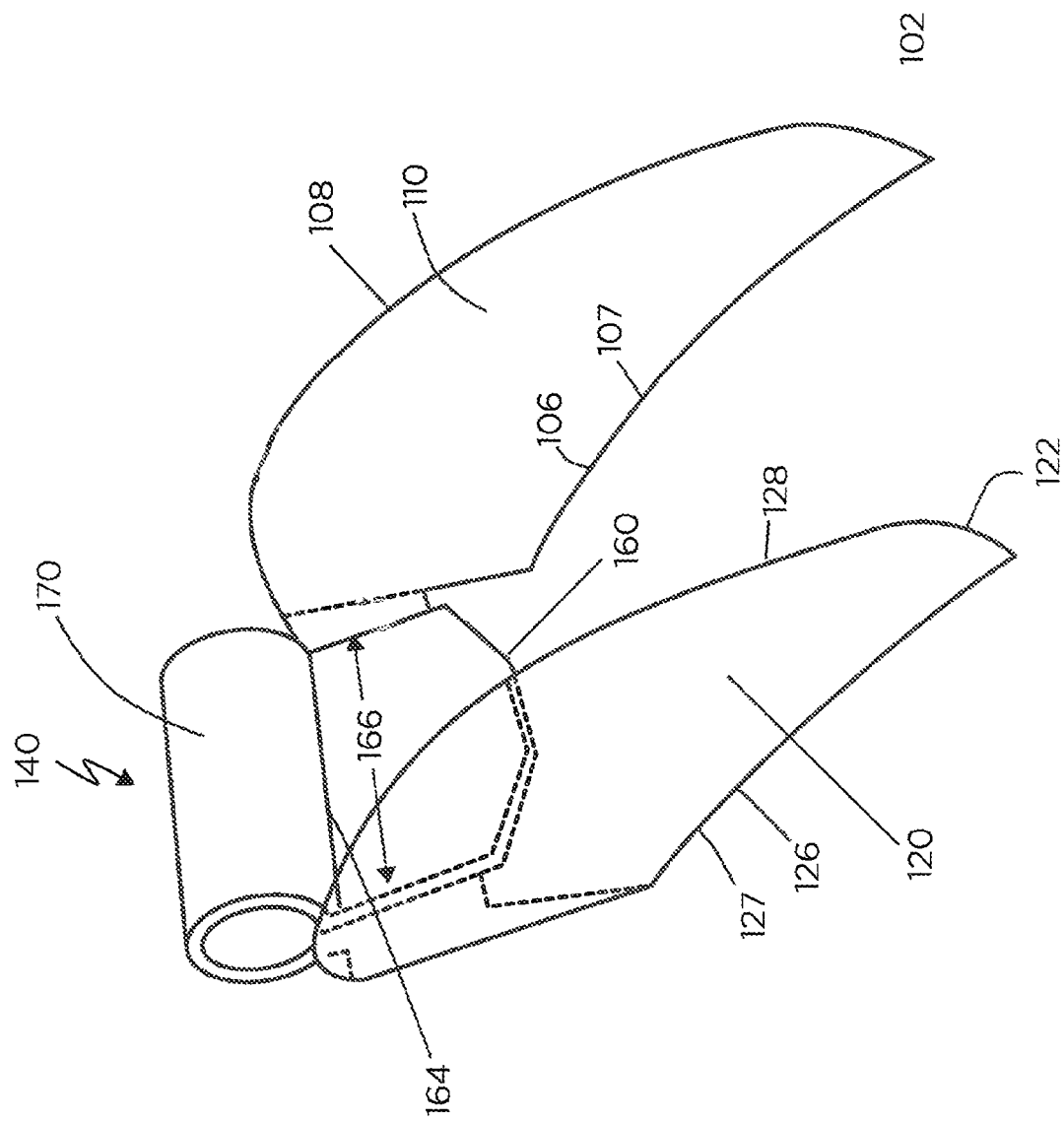
FIG. 6 illustrates a perspective left side front view of the clamp pawl device (1).

A clamp pawl device (1) having an upstanding planar first guide wall (110) and an upstanding planar second guide wall (120) and; the first guide wall (110) having a first guide wall front end (102) and a first guide rear end (104) and the second guide wall (120) having a second guide wall front end (122) and a second guide rear end (124) and; the first guide wall (110) having a first guide wall bottom edge (106) and the second guide wall (120) having a second guide wall bottom edge (126) and; the first guide wall bottom edge (106) having a first guide wall bottom edge arc (107) and the second guide wall bottom edge (126) having a second guide wall bottom edge arc (127) and; the first guide wall bottom edge arc (107) and the second guide wall bottom edge arc (127) determined by the arc of the pipe to which a pipe clamp is to be affixed and; the first guide wall (110) having a first guide wall top edge (108) and the second guide wall (120) having a second guide wall top edge (128) and; the first guide wall (110) having a first guide wall rear edge (112) and the second guide wall (120) having a second guide wall rear edge (130) and; a planar pawl assembly (140) having a pawl first end (150) and a pawl first edge (152) and a pawl tooth (160) with said pawl tooth (160) performing a rachet function; and a pawl assembly first edge (114) and a pawl assembly second edge (132) and; and the pawl tooth (160) having a pawl tooth rear side (162); and, intermediate the pawl first end (150) and the pawl tooth (160) is a pawl pivot (170) which is bent or formed into a semi-circle and then a pawl pivot bend (164) directing the pawl tooth (160) downward so that the pawl tooth (160) is received into a slot (220) of an elongated slotted band (200), and the pawl assembly (140) and the pawl pivot (170) having a spring function biased to move the pawl tooth (160) toward the first guide wall front end (102) and second guide wall front end (122) when a force is applied to the pawl tooth rear side (162) and to return the pawl tooth 160 to a resting state away from the first guide wall front end (102) and the second guide wall front end (122); and the pawl assembly (140) first edge (114) affixed by rigid means including welding to the first guide wall rear edge (112) and the pawl assembly (140) second edge (132) affixed by rigid means including welding to the second guide wall rear edge (130); and a band gap (180) downwardly extending from the pawl first end (150) toward first guide rear end (104) and the second guide rear end (124); and the band gap (180) sized to receive a device, including an elongated slotted band (200), which is moved by a force to contact and move the pawl tooth (160) thereby advancing the movement of the device, including an elongated slotted band (200).

The device further comprising affixing said device of claim 1 by means, including welding, to a slotted band (200) at a band first end (220) and allow a band second end (222) such to be received into and through the band gap (180) of the device of claim 1: and a gear means, including a worm gear (400) affixed to the slotted band (200) intermediate the band first end (220) and the band second end (222), and; where the gear means, including a worm gear (400), has a band gap (180) sized to receive a band first end (220).

The device further comprising affixing said device of claim 1 by means, including welding, to a pipe flange (500) where the band gap (180) receives a slotted band (200) at a band first end (220) and where the pipe flange (500) where slotted band (200) can pass by a force by hand or by a gear means including a worm gear (400); the pipe flange (500) has a pipe flange diameter (510) and a pipe flange arc (520).

The invention claimed is:

1. A clamp pawl device (1) having an upstanding planar first guide wall (110) and an upstanding planar second guide wall (120) and;
   the first guide wall (110) having a first guide wall front end (102) and a first guide rear end (104) and the second guide wall (120) having a second guide wall front end (122) and a second guide rear end (124) and;
   the first guide wall (110) having a first guide wall bottom edge (106) and the second guide wall (120) having a second guide wall bottom edge (126) and;

the first guide wall bottom edge (106) having a first guide wall bottom edge arc (107) and the second guide wall bottom edge (126) having a second guide wall bottom edge arc (127) and;

the first guide wall bottom edge arc (107) and the second guide wall bottom edge arc (127) determined by the arc of the pipe to which a pipe clamp is to be affixed and;

the first guide wall (110) having a first guide wall top edge (108) and the second guide wall (120) having a second guide wall top edge (128) and;

the first guide wall (110) having a first guide wall rear edge (112) and the second guide wall (120) having a second guide wall rear edge (130) and;

a planar pawl assembly (140) having a pawl first end (150) and a pawl first edge (152) and a pawl tooth (160) distal from the with said pawl tooth (160) performing a rachet function; and a pawl assembly first edge (114) and a pawl assembly second edge (132) and; the pawl tooth (160) having a pawl tooth rear side (162);

and, intermediate the pawl first end (150) and the pawl tooth (160) is a pawl pivot (170) which is bent or formed into a semi-circle and then a pawl pivot bend (164) intermediate the pawl pivot (170) and the pawl tooth (160), directing the pawl tooth (160) downward so that the pawl tooth (160) is received into a slot (220) of an elongated slotted band (200), and the pawl assembly (140) and the pawl pivot (170) having a spring function biased to move the pawl tooth (160) toward the first guide wall front end (102) and second guide wall front end (122) when a force is applied to the pawl tooth rear side (162) and to return the pawl tooth 160 to a resting state away from the first guide wall front end (102) and the second guide wall front end (122);

and the pawl assembly (140) first edge (114) affixed by rigid means including welding to the first guide wall rear edge (112) and the pawl assembly (140) second edge (132) affixed by rigid means including welding to the second guide wall rear edge (130); and a band gap (180) downwardly extending from the pawl first end (150) toward first guide rear end (104) and the second guide rear end (124); and the band gap (180) sized to receive a device, including an elongated slotted band (200), which is moved by a force to contact and move the pawl tooth (160) thereby advancing the movement of the device, including an elongated slotted band (200).

2. The device further comprising affixing said device of claim 1 by means, including welding, to a slotted band (200) at a band first end (220) and allow a band second end (222) such to be received into and through the band gap (180) of the device of claim 1: and a gear means, including a worm gear (400) affixed to the slotted band (200) intermediate the band first end (220) and the band second end (222), and; where the gear means, including a worm gear (400), has a band gap (180) sized to receive a band first end (220).

3. The device further comprising affixing said device of claim 1 by means, including welding, to a pipe flange (500) where the band gap (180) receives a slotted band (200) at a band first end (220) and where the pipe flange (500) where slotted band (200) can pass by a force by hand or by a gear means including a worm gear (400); the pipe flange (500) has a pipe flange diameter (510) and a pipe flange arc (520).

* * * * *